United States Patent
Reynolds et al.

(10) Patent No.: US 9,977,786 B2
(45) Date of Patent: May 22, 2018

(54) DISTRIBUTED CODE REPOSITORY WITH LIMITED SYNCHRONIZATION LOCKING

(71) Applicant: GitHub, Inc., San Francisco, CA (US)

(72) Inventors: Patrick Reynolds, Pensacola, FL (US); Michael R. Haggerty, Berlin (DE); Jeffrey King, Charlottesville, VA (US)

(73) Assignee: GitHub, Inc., San Francisco, CA (US)

( * ) Notice: Subject to any disclaimer, the term of this patent is extended or adjusted under 35 U.S.C. 154(b) by 228 days.

(21) Appl. No.: 14/998,079

(22) Filed: Dec. 23, 2015

(65) Prior Publication Data

US 2017/0185627 A1  Jun. 29, 2017

(51) Int. Cl.
| | | |
|---|---|---|
| *G06F 17/30* | (2006.01) | |
| *G06F 9/44* | (2018.01) | |
| *G06F 9/45* | (2006.01) | |
| *G06F 9/445* | (2018.01) | |

(52) U.S. Cl.
CPC .......... *G06F 17/30171* (2013.01); *G06F 8/36* (2013.01); *G06F 8/49* (2013.01); *G06F 8/65* (2013.01); *G06F 17/30174* (2013.01); *G06F 8/71* (2013.01)

(58) Field of Classification Search
None
See application file for complete search history.

(56) References Cited

U.S. PATENT DOCUMENTS

| | | | | |
|---|---|---|---|---|
| 7,451,434 B1 * | 11/2008 | Blumenthal | ............ | G06F 9/544 |
| | | | | 707/999.103 |
| 7,769,792 B1 * | 8/2010 | Burrows | ........... | G06F 17/30306 |
| | | | | 707/638 |
| 8,443,354 B1 | 5/2013 | Satish | | |
| 2002/0138706 A1 * | 9/2002 | Hugly | ........................ | G06F 9/52 |
| | | | | 711/163 |
| 2003/0105756 A1 * | 6/2003 | Daynes | .................... | G06F 9/526 |
| 2004/0186825 A1 * | 9/2004 | Dettinger | .......... | G06F 17/30362 |
| 2005/0086384 A1 | 4/2005 | Ernst | | |
| 2006/0265704 A1 * | 11/2006 | Holt | ........................ | G06F 8/456 |
| | | | | 717/169 |
| 2008/0005112 A1 * | 1/2008 | Shavit | ..................... | G06F 9/526 |
| 2009/0292705 A1 * | 11/2009 | McKenney | ........ | G06F 17/30356 |
| 2010/0305721 A1 * | 12/2010 | Kostadinov | ......... | G05B 19/0426 |
| | | | | 700/87 |
| 2011/0283256 A1 * | 11/2011 | Raundahl Gregersen | ................ | |
| | | | | G06F 8/67 |
| | | | | 717/108 |
| 2012/0174082 A1 * | 7/2012 | Dolby | ....................... | G06F 8/72 |
| | | | | 717/151 |
| 2012/0254846 A1 * | 10/2012 | Moir | ....................... | G06F 9/467 |
| | | | | 717/152 |
| 2013/0061155 A1 | 3/2013 | Hon | | |

(Continued)

OTHER PUBLICATIONS

Sadoghi et al., "Reducing Database Locking Contention Through Multiversion Concurrency," 2014.*

*Primary Examiner* — Insun Kang
(74) *Attorney, Agent, or Firm* — Van Pelt, Yi & James LLP

(57) ABSTRACT

A system for a distributed repository includes an input interface and a processor. The input interface is to receive a request to change a portion of code. The processor is to determine a change reference and an existing reference, indicate to lock one or more repositories, determine whether swapping references is approved by a vote, and in the event that swapping references is approved by a vote, swap the references and indicate to unlock the one or more repositories.

17 Claims, 9 Drawing Sheets

(56) References Cited

U.S. PATENT DOCUMENTS

| | | | |
|---|---|---|---|
| 2013/0166506 A1* | 6/2013 | Schwarzmann | G06F 17/30371 707/611 |
| 2014/0047413 A1 | 2/2014 | Sheive | |
| 2014/0258645 A1* | 9/2014 | Dice | G06F 9/467 711/152 |
| 2014/0297589 A1* | 10/2014 | Chen | G06F 17/30 707/624 |
| 2015/0205600 A1* | 7/2015 | Grillo | G06F 8/70 717/101 |
| 2015/0234933 A1* | 8/2015 | Grover | G06F 17/30949 707/800 |
| 2015/0363175 A1* | 12/2015 | Klausner | G06F 8/34 717/109 |
| 2016/0085777 A1* | 3/2016 | Engelko | G06F 17/30292 707/803 |
| 2016/0092526 A1* | 3/2016 | Kothari | G06F 17/30563 707/602 |
| 2016/0196295 A1* | 7/2016 | Bhattacharjee | G06F 17/30351 707/607 |

* cited by examiner

DISTRIBUTED CODE REPOSITORY WITH LIMITED SYNCHRONIZATION LOCKING

BACKGROUND OF THE INVENTION

A system for storing software comprises an online software repository hosting code for software developers. The online software repository assists with project sharing, collaboration, version control, etc. When multiple developers are working on a single project, collisions in changes made simultaneously can be avoided by locking the repository as a change is being made (e.g., only allowing one write at a time). However, locking the repositories creates inefficiencies as the repositories are unavailable when locked for other processes wanting to make a change. As the system is used by an increasingly large number of software developers, more and more locking will increase the time the system is unavailable.

BRIEF DESCRIPTION OF THE DRAWINGS

Various embodiments of the invention are disclosed in the following detailed description and the accompanying drawings.

DETAILED DESCRIPTION

Figure 1:
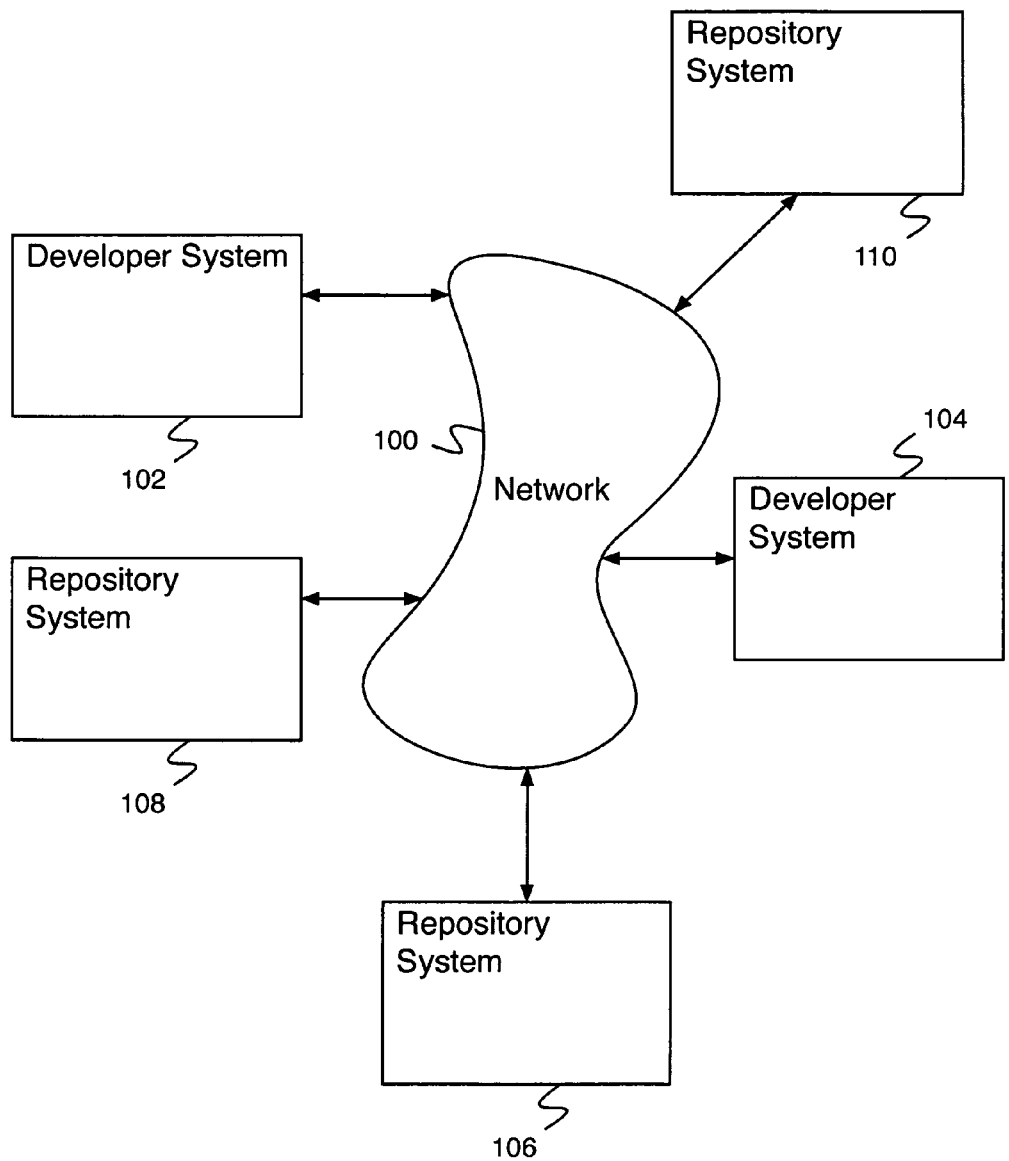
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for a distributed repository comprises an input interface to receive a request to change a portion of code and a processor to determine a change reference and an existing reference, indicate to lock one or more repositories, determine whether swapping references is approved by a vote, in the event that swapping references is approved by a vote, swap the references, and indicate to unlock the one or more repositories. In some embodiments, the system comprises a memory coupled to the processor and configured to provide the processor with instructions.

In some embodiments, a system for a distributed repository comprises a system for a distributed code repository with limited synchronization locking. The system for a distributed code repository comprises a code repository system for storing software projects. In various embodiments, the system for storing software projects comprises a system for storing software, for enabling collaboration, for providing version control, for publishing software, or for any other appropriate purpose. Software projects are stored on the code repository and shared between software developers or published to be viewed or modified publicly. When a code repository system becomes widely used (e.g., by a large number of users across many different locations), it becomes advantageous to use a distributed repository system (e.g., use a set of repositories distributed geographically, among users, etc.). The distributed repository system uses multiple repository servers, each of which comprises the entire code repository. When a change is made to the code repository on one repository server, it is mirrored to the other repository servers. Multiple users may be attempting to modify the code repository at any given time, so the files that are being modified must be locked in order to prevent multiple changes made to a single file at the same time. When change data indicating a change to a file is received by one of the repository servers, it is mirrored to the other repository servers and then checked by each for correctness (e.g., using a checksum distributed with the change data). The files to be modified are then locked on all servers and checked for synchronization (e.g., that the corresponding files on the different servers are all of the same version). In the event it is determined that enough servers are synchronized, the files are then modified using the change data, and the lock is removed. In various embodiments, enough servers is a majority of servers, any set of servers that includes a designated primary server, all servers, or any other appropriate set of servers.

In some embodiments, write functionality is removed for other users during the time the lock is held. This time should be minimized in order to reduce the disruption in performance. The file storage structure used for the code repository is designed for preserving all versions of all files, and is easily adapted to minimizing a modification time. Rather than modifying a file by modifying the stored code data, the new code data is stored in the database along with the previous version of the code data. An index file for a software project stores a set of references to sections of code data. The code data sections indicated by the references can be assembled to create the complete software project. When a file is modified, the only change to the file that is required to happen while the lock is held is swapping the reference from pointing to the previous version of the code data to pointing to the new version of the code data. This change can be made very quickly (e.g., compared to the time to write the code data change to disk), minimizing the necessary lock time.

In some embodiments, locking is important in distributed systems because one user needs to ensure that no one else is making changes while they are. But locking also has costs in terms of speed and user experience. Thus, it is desirable to design locks that are unobtrusive as possible in a distributed system. For example, you typically would not even want a read only operation to proceed while a write is happening. A common solution is to use reader-write locks. Multiple readers can obtain read locks and perform their operations, so long as no writers are present. Only one writer at a time can proceed, and that writer holds a lock that prevents any readers.

In some embodiments, almost any distributed system with locks will take steps to minimize the scope (e.g., how much data is locked) and duration (e.g., how long it is locked) of locks held. The system for a distributed repository focuses on the duration of the lock held. In the example shown, the repository is locked at the time of updating a reference rather than every time a change is made. Data objects are stored to an isolated namespace with no locks held. Only when moving those objects to a visible namespace (e.g., updating a visible reference to a version of code data) is the lock held.

In some embodiments, in a distributed system it is desired to appear that there is one single copy, even when two users read and write different copies. One way to do this is to lock the entire repository when data is uploaded so that no other user can write to it until the upload is complete. However, that can result in the repository being locked for a long time. Any lock that lasts for a long time (e.g., more than about a second) is disruptive to the user experience and slows the system considerably. For example, a user attempting to perform a small write (e.g., deleting a code branch) might have their interface locked until another user's large upload is complete.

In the example shown, the only part of the update process that is performed while a lock is held is the point when the update data is assigned to a reference branch. This is due to the file system storing all previous versions of files and basing the construction of new versions of files on the old versions. When an update is made to a file, the reference is swapped from the old version of the file to the updated version of the file. This additionally allows read operations to be performed without a lock being held. Even in the event that a file is updated while it is being read, the specific version of the file that is being read will not be changed.

FIG. 1 is a block diagram illustrating an embodiment of a network system. In some embodiments, the network system of FIG. 1 comprises a system for storing large assets using a system for revision control. In some embodiments, the network system of FIG. 1 provides communication between any appropriate number of software developers and a revision control server. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. In the example shown, developer system 102 and developer system 104 comprise systems for use by a software developer while developing software. In various embodiments, there are 1, 6, 22, 122, 1059, or any other appropriate number of developer systems communicating with network 100. In some embodiments, a developer system comprises a processor and a memory. Repository system 106, repository system 108, and repository system 110 comprise server systems for storing data. In various embodiments, there are 1, 2, 3, 4, 5, 7, 9, 14, 22, or any other appropriate number of repository systems. In some embodiments, a repository system comprises a processor and a memory. In some embodiments, repository system 106, repository system 108, and repository system 110 comprise server systems for storing code. In various embodiments, repository system 106, repository system 108, and repository system 110 comprise systems for storing software, for enabling collaboration, for providing version control, for publishing software, or for any other appropriate purpose. In some embodiments, a developer system downloads a software repository from a repository system. In some embodiments, a developer system uploads software modifications to a software repository. In some embodiments, each repository system stores the same software. In some embodiments, a developer system communicates with all repository systems to store software changes. In some embodiments, a developer system communicates with an intermediate server or proxy that communicates with all repository systems to store software changes. In some embodiments, a developer system communicates with one repository system to store software changes, and any changes made to the repository system are copied directly to the other repository systems. In various embodiments, a developer system communicates with the nearest repository system, with the least busy repository system, with the repository system with the fewest number of connected developer systems, with a repository system selected by a developer, or with a repository system selected in any other appropriate way. In some embodiments, when a developer makes a change to a repository system, the repository system locks the repository while the change is made (e.g., in order to prevent a separate change from being made to the repository at the same time. In some embodiments, when a developer makes a change to a repository system, all repository systems are locked and the change is made to each.

Figure 2:
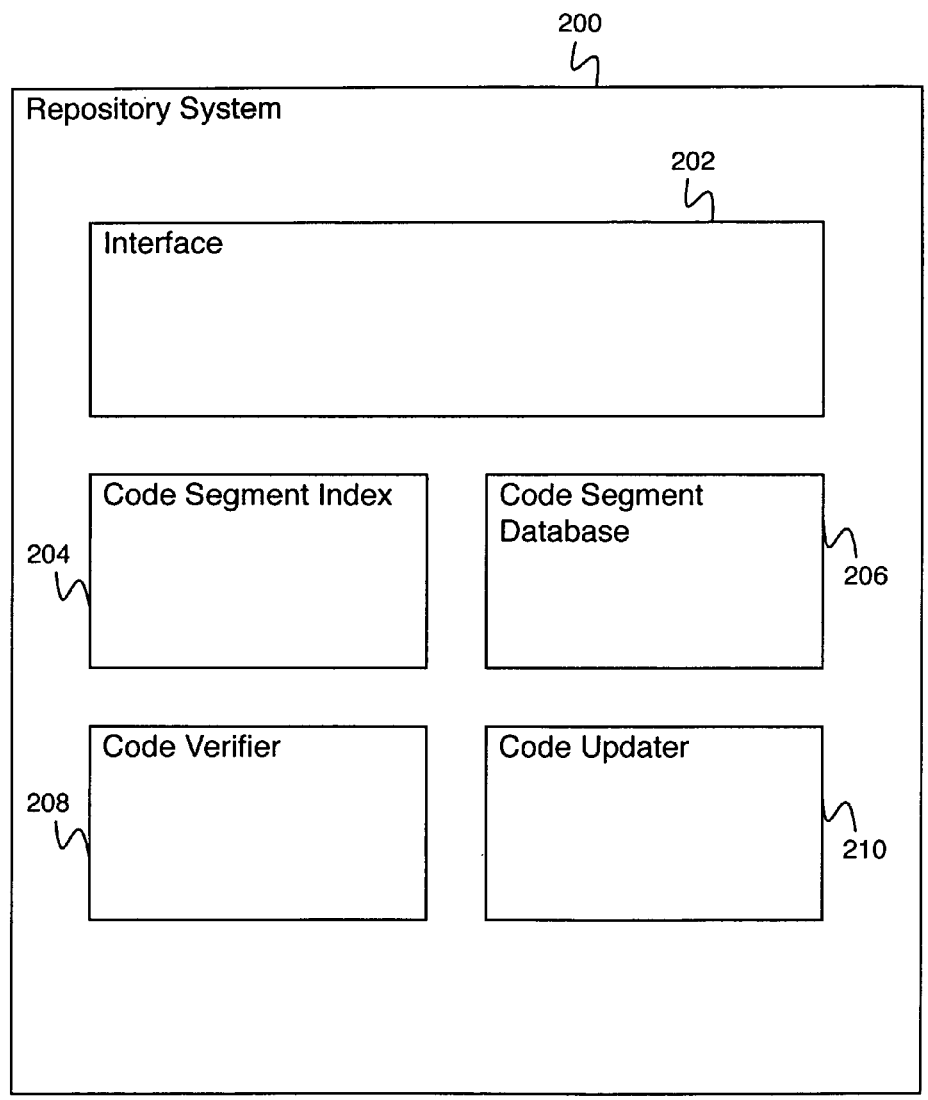
FIG. 2 is a block diagram illustrating an embodiment of a repository system.

FIG. 2 is a block diagram illustrating an embodiment of a repository system. In various embodiments, repository system 200 of FIG. 2 comprises repository system 106 of FIG. 1, repository system 108 of FIG. 1, or repository system 110 of FIG. 1. In the example shown, repository system 200 comprises interface 202. In some embodiments, interface 202 comprises an interface for communicating with a network. In various embodiments, interface 202 comprises an interface for providing a code repository to a user, providing a portion of code to a user, providing an indication of a code change to a user, providing a code change to a repository system, receiving a code change from a user, receiving a code change from a repository system, providing or receiving a vote on a code change, providing or receiving an indication to lock the repository, or providing or receiving any other appropriate information. In some embodiments, interface 202' is implemented using a processor. Code segment index 204 comprises a code segment index for storing an index to a set of code segments. In some embodiments, code segment index 204 comprises a set of references. In some embodiments, code segment index 204 comprises a set of files (e.g., code documents, etc.), each file comprising a set of references to code segments. In some embodiments, code segment index 204 comprises multiple versions of a single file. In some embodiments, different versions of a single file comprise references to different code segments. In some embodiments, different versions of a single file comprise references to some of the same code segments. In some embodiments, a version of a file comprises a version number, a version update date, a version identifier, a summary or hash of file contents, or any other appropriate version indicator. In some embodiments, code segment database 206 comprises code segments referred to in code segment index 204. In some embodiments, code segments comprise portions of files. In some embodiments, the code segments comprising a file are indicated in an index file stored in code segment index 204. In some embodiments, the code segments comprising a file are stored in code segment database 206. Code verifier 208 comprises a code verifier for verifying code. In some embodiments, code verifier 208 verifies that an uploaded code file is correct (e.g., by checking a checksum). In some embodiments, code verifier 208 verifies the state of the repository is a desired state (e.g., by checking the version indicator associated with one or more file indices stored in code segment index 204). In some embodiments, code verifier 208 determines an update vote (e.g., whether it is determined to update the repository). In some embodiments, code verifier 208 is implemented using a processor. Code updater 210 comprises a code updater for updating code stored on the repository. In various embodiments, code updater 210 determines a change reference (e.g., a reference in code segment index 204 indicating a code segment replacing an existing code segment in an updated version of a file), code updater 210 determines an existing reference (e.g., a reference in code segment index 204 indicating a code segment to be replaced in an updated version of a file), code updater 210 indicates to lock one or more repositories, code verifier 208 determines whether swapping references is approved by a vote, code segment updater 210 swaps references, code segment updater 210 indicates to unlock one or more repositories, or code segment updater performs any other appropriate code segment updating action. In various embodiments, the elements of repository system 200 are all implemented using a single processor, are each implemented using their own processor, or are combined onto a plurality of processors in any other appropriate way. In some embodiments, repository system 200 additionally comprises a memory coupled to one or more processors. In various embodiments, the memory comprises a magnetic memory, an optical memory, a solid-state memory, a flash memory, a non-volatile memory, a read-only memory, a tape memory, a disc memory, or any other appropriate memory.

Figure 3:
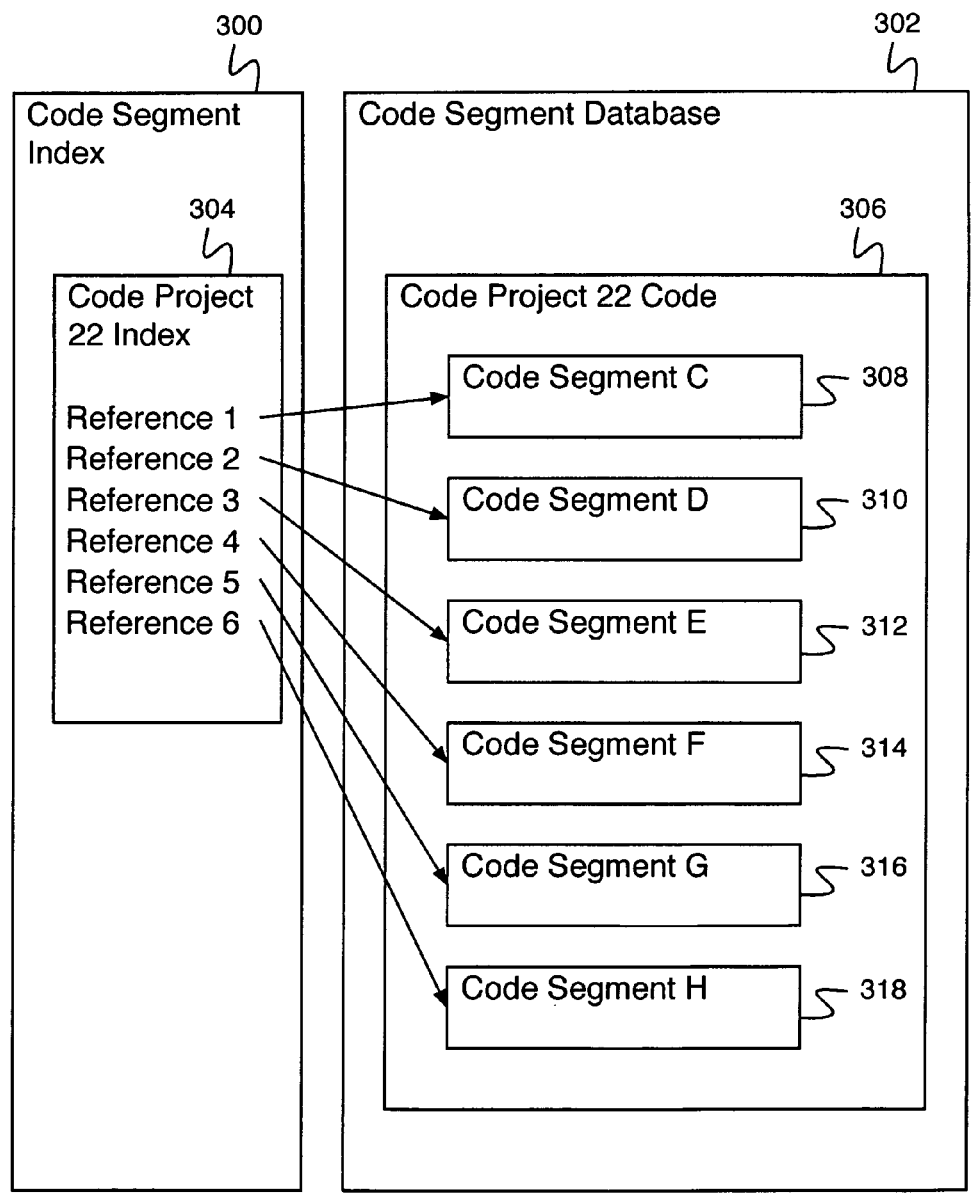
FIG. 3 is a diagram illustrating an embodiment of a code segment index and a code segment database.

FIG. 3 is a diagram illustrating an embodiment of a code segment index and a code segment database. In some embodiments, code segment index 300 comprises code segment index 204 of FIG. 2 and code segment database 302 comprises code segment database 206 of FIG. 2. In the example shown, code segment index 300 comprises code project 22 index 304. In some embodiments, code project 22 index 304 comprises an index to a software project stored on a repository system. In some embodiments, code project 22 index 304 comprises an index to a software project titled code project 22. In some embodiments, code project 22 comprises the only software project stored on the software repository. In some embodiments, code project 22 comprises a project of a plurality of projects stored on the software repository. In some embodiments, code project 22 and a plurality of other code projects are stored on the same software repository. In the example shown, code project 22 index 304 comprises a set of references. In some embodiments, a reference comprises a pointer (e.g., an indicator of a location in memory). Reference 1 comprises a reference to code segment C 308 of code segment database 302; reference 2 comprises a reference to code segment D 310 of code segment database 302; reference 3 comprises a reference to code segment E 312 of code segment database 302; reference 4 comprises a reference to code segment F 314 of code segment database 302; reference 5 comprises a reference to code segment G 316 of code segment database 302; reference 6 comprises a reference to code segment H 318 of code segment database 302; etc. In some embodiments, the code segments referred to by the set of references stored in code project 22 index 304 combine to form code project 22 in its most current form. In some embodiments, previous versions of code project 22 exist (e.g., and are referred to by different index files). In some embodiments, the code segments of code project 22 are stored in a container within code segment database 302 (e.g., code project 22 code 306). In some embodiments, the code segments of code project 22 are not stored in a container within code segment database 302.

Figure 4:
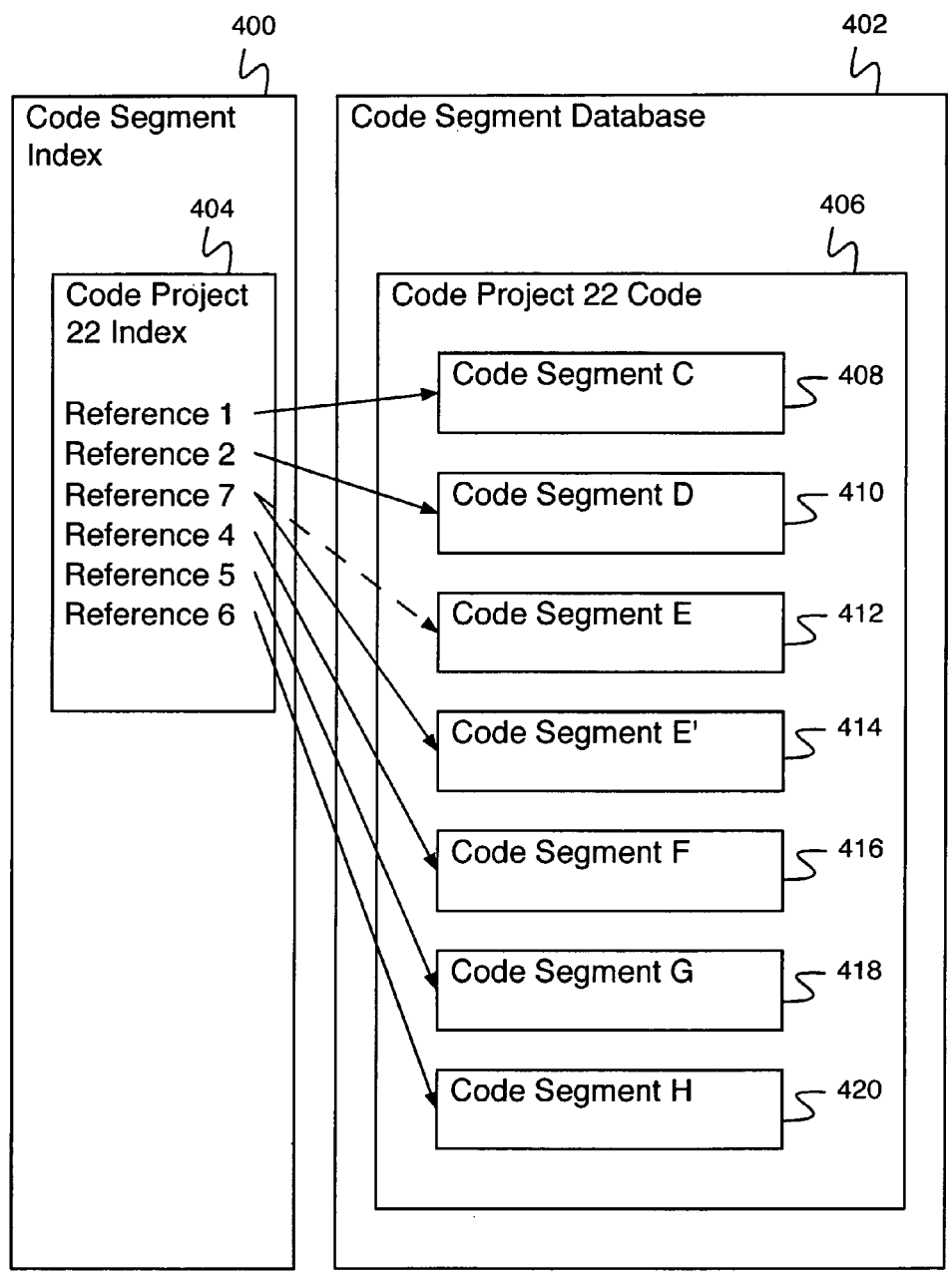
FIG. 4 is a diagram illustrating an embodiment of swapping a reference in a code segment index.

FIG. 4 is a diagram illustrating an embodiment of swapping a reference in a code segment index. In some embodiments, code segment index 400 comprises code segment index 204 of FIG. 2 and code segment database 402 comprises code segment database 206 of FIG. 2. Code segment index 400 comprises code project 22 index 404. In some embodiments, code project 22 index 404 comprises code project 22 index 304 of FIG. 3 during the process of swapping a reference. In some embodiments, software (e.g., code project 22) in a software repository is updated by swapping a reference. In the example shown, reference 1 comprises a reference to code segment C 408 of code segment database 402; reference 2 comprises a reference to code segment D 410 of code segment database 402; reference 4 comprises a reference to code segment F 416 of code segment database 402; reference 5 comprises a reference to code segment G 418 of code segment database 402; reference 6 comprises a reference to code segment H 420 of code segment database 402; etc. Reference 3 of code project 22 index 404 pointing to code segment E 412 was removed and replaced with (e.g., swapped for) reference 7 pointing to code segment E' 414. Code segment E comprises a previous version of a code segment and code segment E' comprises a replacement version of the code segment. In some embodiments, reference 3 comprises an existing reference and reference 7 comprises a change reference. In some embodiments, the references are swapped after it is determined that swapping references is approved by a vote.

Figure 5:
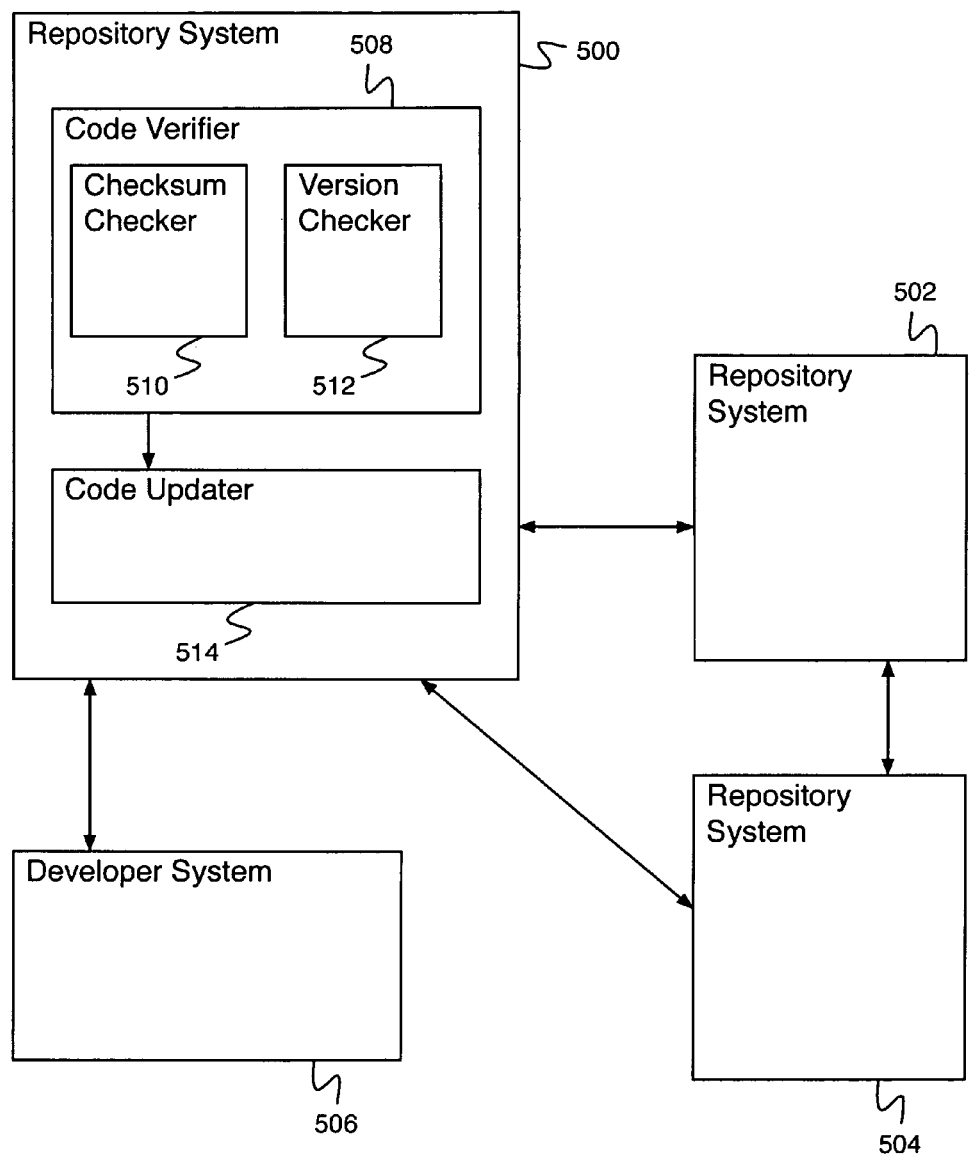
FIG. 5 is a diagram illustrating an embodiment of communication between repository systems.

FIG. 5 is a diagram illustrating an embodiment of communication between repository systems. In some embodiments, the repository systems of FIG. 5 comprise the repository systems of FIG. 1. In some embodiments, developer system 506 comprises a developer system 506 of FIG. 1. In some embodiments, the systems of FIG. 5 communicate via a network (e.g., network 100 of FIG. 1). In the example shown, repository system 500 communicates with repository system 502 and repository system 504. Repository system 500 comprises a repository system that has received a request to update a file (e.g., from developer system 506). In some embodiments, the request to update a file comprises a code segment and a checksum. In some embodiments, repository system 500 checks the code segment using the checksum (e.g., using checksum checker 510) to determine whether the code segment has been received correctly. In some embodiments, repository system 500 determines the previous (e.g., before updating) version number of the file to be updated (e.g., using version checker 512). In some embodiments, repository system 500 provides the request to update the file, including the code segment and the checksum, to repository system 502 and repository system 504. In some embodiments, the request to update the file additionally includes the version number of the file to be updated. In some embodiments, repository system 502 and repository system 504 determine whether they received the file correctly (e.g., using the checksum). In some embodiments, repository system 502 and repository system 504 determine whether they have the same previous version of the file to be updated (e.g., using the version number). Each of repository system 502 and repository system 504 provides a vote to repository system 500 indicating whether swapping references is approved. Each of repository system 502 and repository system 504 provides a vote to approve swapping references in the event it is determined that the file is received correctly and the previous version of the file is the same as on repository system 500. Repository system 500 determines whether swapping references is approved by the vote. In some embodiments, swapping references is approved by the vote in the event that more than half (e.g., 2 out of 3) of the repository systems approve swapping references. In some embodiments, in the event a repository system provides a vote to disapprove swapping references but swapping references is approved by the vote, a repair indication is provided to the system that provided the vote to disapprove swapping references. In some embodiments, in the event swapping references is disapproved by the vote, an indication is provided to developer system 506 that swapping references has failed. In some embodiments, voting to determine whether to swap references is performed while the repository systems are locked (e.g., after an indication to lock the repository systems has been provided). In some embodiments, voting to determine whether to swap references is performed while the repository systems are locked in order to ensure that the file will not be changed during the period of time from when the vote is performed (e.g., when the previous version of the file is checked to confirm it matches the previous version of the file on developer system 500) until when the references are swapped.

Figure 6:
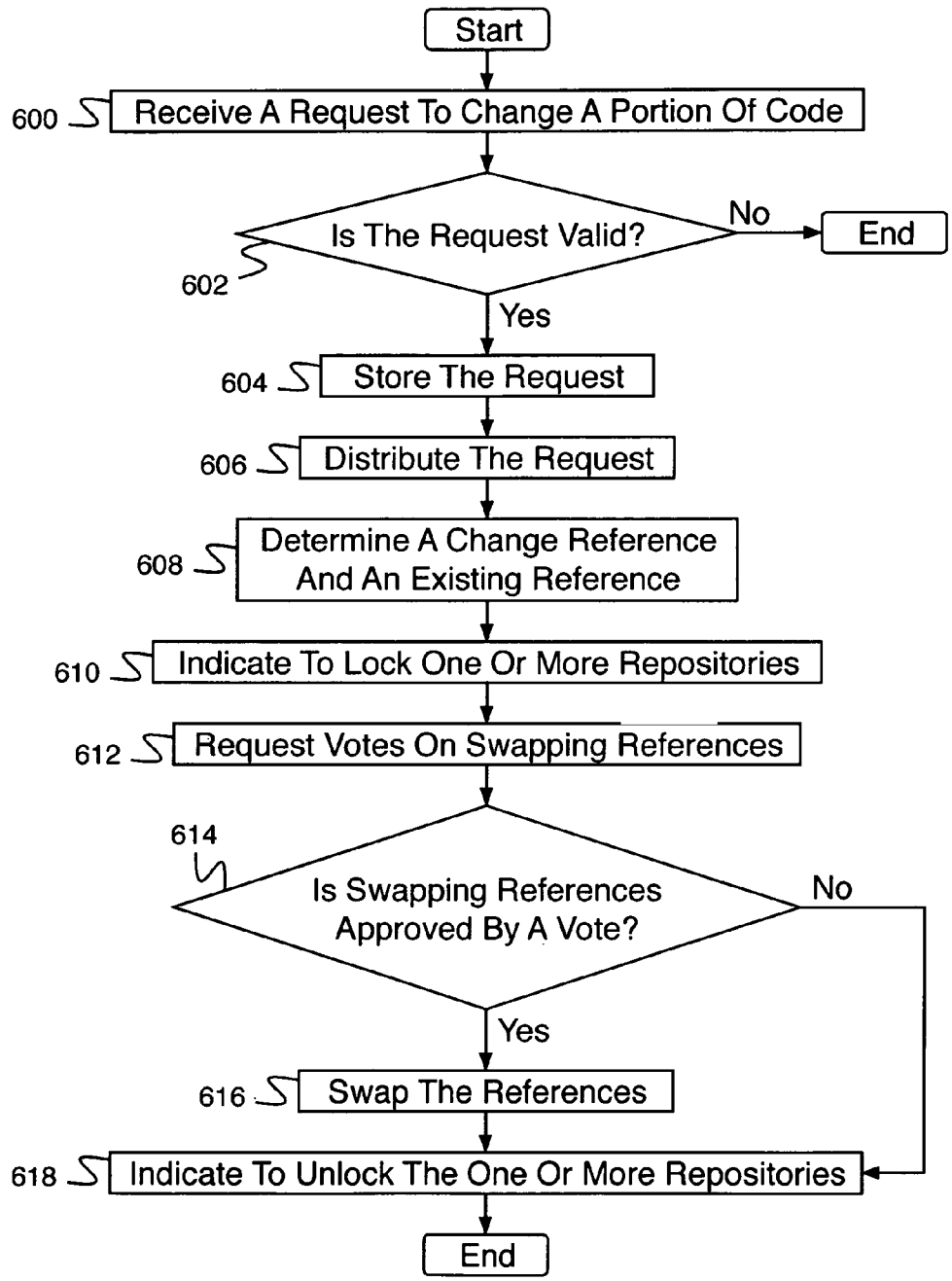
FIG. 6 is a flow diagram illustrating an embodiment of a process for updating a file on a distributed repository.

FIG. 6 is a flow diagram illustrating an embodiment of a process for updating a file on a distributed repository. In some embodiments, the process of FIG. 6 is performed by a repository system (e.g., repository system 106 of FIG. 1, repository system 108 of FIG. 1, or repository system 110 of FIG. 1). In the example shown, in 600, a request is received to change a portion of code. In some embodiments, the request is received from a developer system. In some embodiments, the request comprises a new portion of code. In various embodiments, the request comprises associated metadata, a checksum, an indicator of the portion of code to be replaced by the new portion of code, or any other appropriate data. In 602, it is determined whether the request is valid. In some embodiments, determining whether the request is valid comprises checking the new portion of code using a checksum. In the event it is determined that the request is not valid, the process ends. In some embodiments, in the event it is determined that the request is not valid, an error message is provided (e.g., to the developer system). In the event it is determined in 602 that the request is valid, control passes to 604. In 604, the request is stored. In some embodiments, storing the request comprises storing the new portion of code in a code segment database. In 606, the request is distributed. In some embodiments, distributing the request comprises providing the request to other repository systems. In some, embodiments, distributing the request comprises providing the new portion of code and the checksum. In 608, a change reference and an existing reference are determined. In some embodiments, an existing reference comprises a reference indicating the storage location of a portion of code to be replaced by the new portion of code. In some embodiments, a change reference indicates the storage location of the new portion of code. In 610, the process indicates to lock one or more repositories. In some embodiments, indicating to lock one or more repositories comprises providing an indication of a ready to lock state. In some embodiments, the repository is locked. In some embodiments, the file to be modified is locked. In 612, the process requests votes on swapping references. In some embodiments, a vote on swapping references comprises a swap indication. In 614, it is determined whether swapping references is approved by a vote. In some embodiments, determining whether swapping references is approved by a vote comprises receiving a swap indication from one or more other systems. In some embodiments, determining whether swapping references is approved by a vote comprises determining whether a majority of swap indications received indicate to swap references. In some embodiments, in the event a swap indication to not swap is received but swapping references is approved, a repair indication is provided to the system that provided the swap indication to not swap.

In the event it is determined that swapping references is not approved by a vote, control passes to 618. In some embodiments, in the event that swapping references is not approved by a vote, an indication that changing a portion of code has failed. In the event it is determined in 614 that swapping references is approved by a vote, control passes to 616. In some embodiments, in the event it is determined that swapping references is approved, an indication is provided that changing a portion of code has completed. In 616, the references are swapped. Control then passes to 618. In 618, the process indicates to unlock the one or more repositories. In some embodiments, the repository is unlocked. In some embodiments, the modified file is unlocked.

Figure 7:
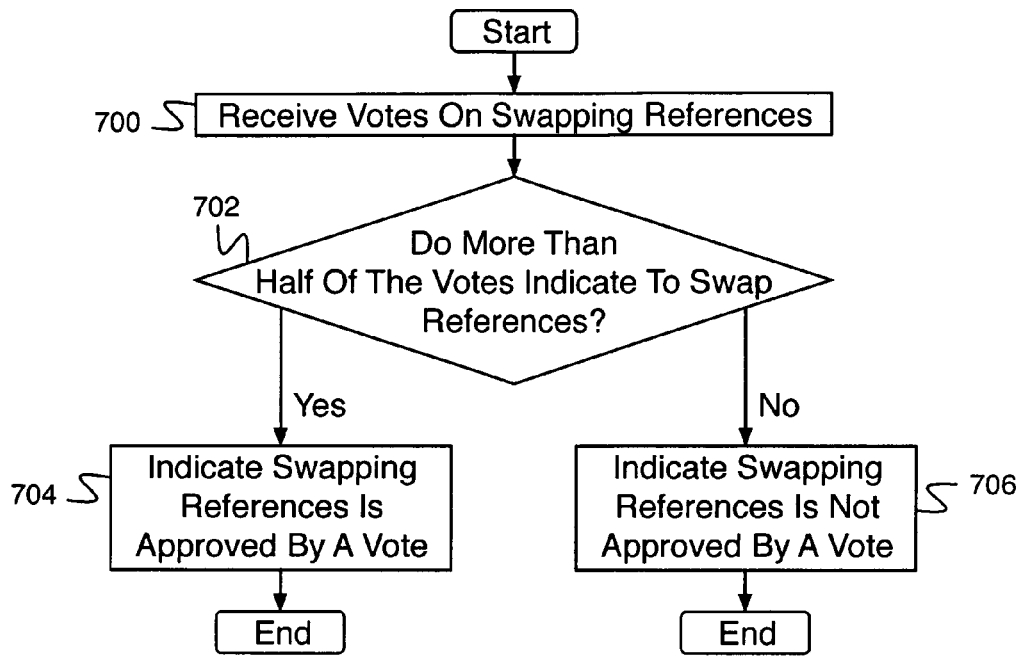
FIG. 7 is a flow diagram illustrating an embodiment of a process for determining whether swapping references is approved by a vote.

FIG. 7 is a flow diagram illustrating an embodiment of a process for determining whether swapping references is approved by a vote. In some embodiments, the process of FIG. 7 implements 614 of FIG. 6. In the example shown, in 700, votes on swapping references are received. In some embodiments, votes on swapping references are received from one or more repository systems. In 702, it is determined whether more than half of the votes indicate to swap references. In the event it is determined that more than half of the votes indicate to swap references, control passes to 704. In 704, the process indicates that swapping references is approved by a vote, and the process ends. In the event it is determined in 702 that more than half of the votes do not indicate to swap references, control passes to 706. In 706, the process indicates swapping references is not approved by a vote, and the process ends.

Figure 8:
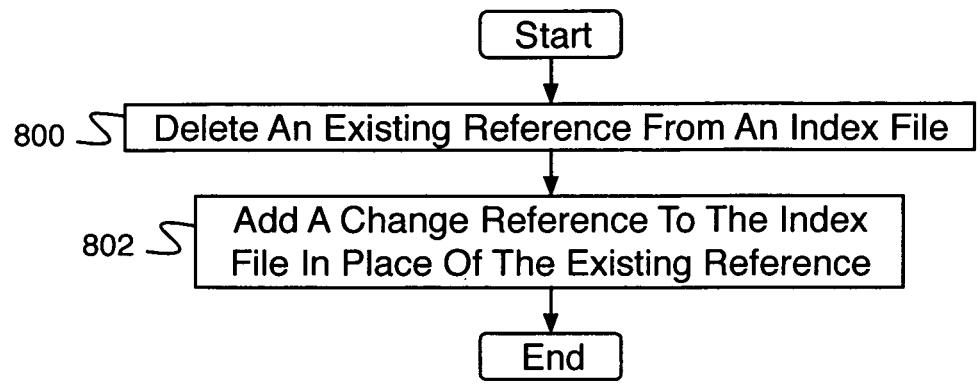
FIG. 8 is a flow diagram illustrating an embodiment of a process for swapping references.

FIG. 8 is a flow diagram illustrating an embodiment of a process for swapping references. In some embodiments, the process of FIG. 8 implements 616 of FIG. 6. In the example shown, in 800, an existing reference is deleted from an index file. In some embodiments, the index file is duplicated before the existing reference is deleted in order to preserve the previous version of the index file. In 802, a change reference is added to the index file in place of the existing reference. In some embodiments, the change reference points to a piece of code that replaces the piece of code pointed to by the existing reference. In some embodiments, a new version number for the index file is determined. In some embodiments, a new checksum for the index file is determined.

Figure 9:
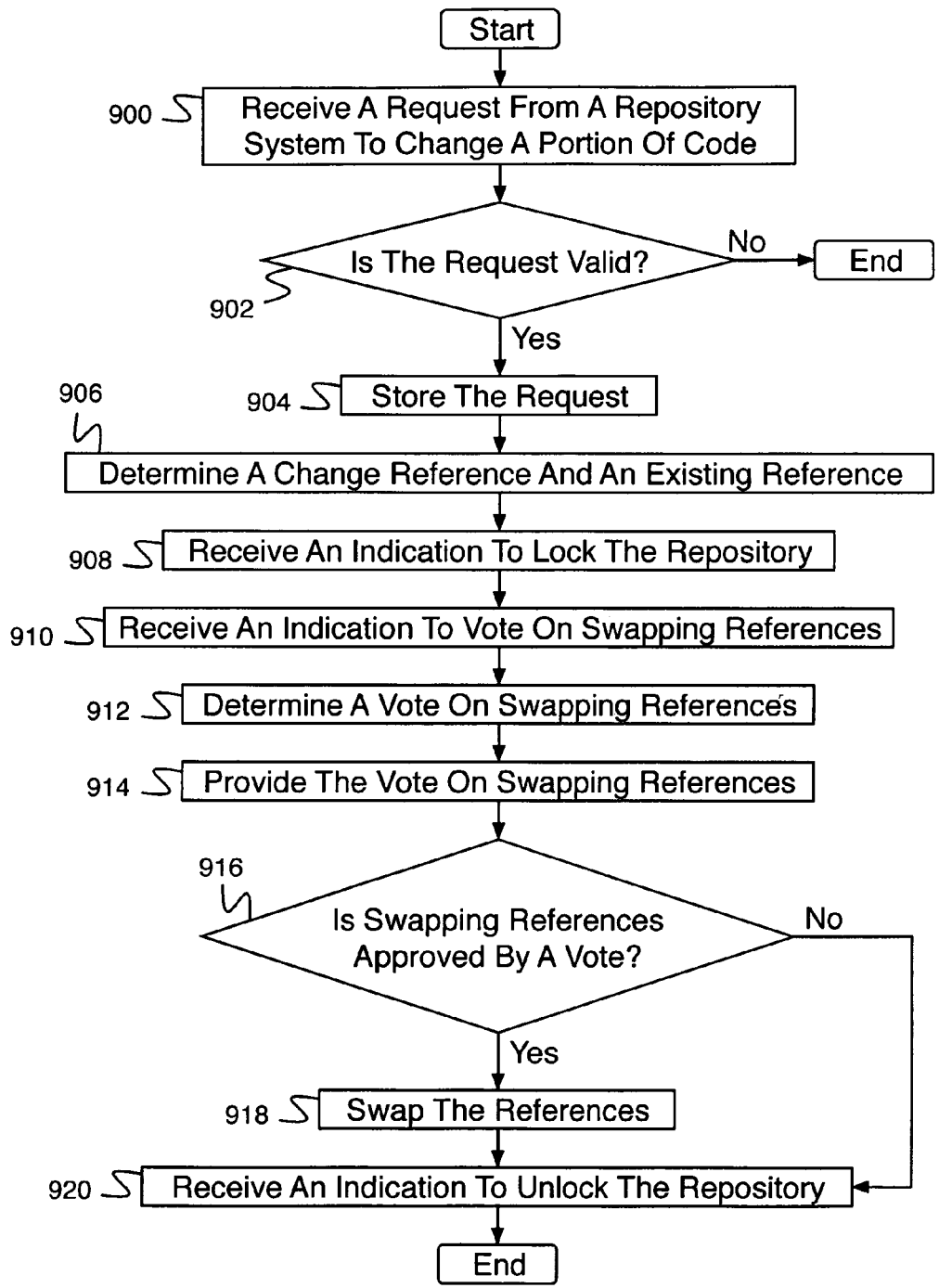
FIG. 9 is a flow diagram illustrating an embodiment of a process for updating a file on a distributed repository.

FIG. 9 is a flow diagram illustrating an embodiment of a process for updating a file on a distributed repository. In some embodiments, the process of FIG. 9 is performed by a repository system (e.g., repository system 106 of FIG. 1, repository system 108 of FIG. 1, or repository system 110 of FIG. 1). In the example shown, in 900, a request is received from a repository system to change a portion of code. In some embodiments, the request comprises a new portion of code. In some embodiments, the request comprises a checksum. In some embodiments, the request comprises an indicator of the portion of code to be replaced by the new portion of code. In some embodiments, the request comprises a version number of the portion of code to be replaced by the new portion of code. In 902, it is determined whether the request is valid. In some embodiments, determining whether the request is valid comprises checking the new portion of code using a checksum. In the event it is determined that the request is not valid, the process ends. In some embodiments, in the event it is determined that the request is not valid, an error message is provided (e.g., to the repository system). In the event it is determined in 902 that the request is valid, control passes to 904. In 904, the request is stored. In some embodiments, storing the request comprises storing the new portion of code in a code segment database. In 906, a change reference and an existing reference are determined. In some embodiments, an existing reference comprises a reference indicating the storage location of a portion of code to be replaced by the new portion of code. In some embodiments, a change reference indicates the storage location of the new portion of code. In 908, an indication to lock the repository is received. In some embodiments, the repository is locked. In some embodiments, the file to be modified is locked. In 910, an indication to vote on swapping references is received. In 912, a vote is determined on swapping references. In some embodiments, it is determined to approve swapping references in the event a version number matches a version number associated with the request to change a portion of code. In 914, the vote on swapping references is provided. In some embodiments, the vote is provided to the repository system that requested the change. In some embodiments the vote is provided to all repository systems. In 916, it is determined whether swapping references is approved by a vote. In some embodiments, determining whether swapping references is approved by a vote comprises determining whether a majority of votes indicate to swap references. In the event it is determined that swapping references is not approved by a vote, control passes to 920. In the event it is determined that swapping references is approved by a vote, control passes to 918. In 918, the references are swapped. Control then passes to 920. In 920, an indication to unlock the repository is received. In some embodiments, the repository is unlocked. In some embodiments, the modified file is unlocked.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a hardware processor configured to:
receive a request to change a portion of code;
determine a change reference associated with the code and an existing reference associated with the code;
indicate to lock a plurality of repositories of a distributed repository with access to the code;
request the plurality of repositories to approve the request to change the portion of code;
receive a corresponding vote from each repository of the plurality of repositories;
determine whether swapping references is approved by a majority of the plurality of repositories based on the corresponding votes;
in response to determining that swapping references is approved by the majority of the plurality of repositories:
modify the code by swapping the existing reference associated with the code with the change reference associated with the code; and
indicate to unlock the plurality of repositories; and
a memory coupled to the hardware processor and configured to provide the hardware processor with instructions.

2. The system of claim 1, wherein a reference comprises a pointer.

3. The system of claim 1, wherein the request to change the portion of code comprises a new portion of code.

4. The system of claim 3, wherein the new portion of code comprises a code block and associated metadata.

5. The system of claim 3, wherein the hardware processor is additionally configured to store the new portion of code.

6. The system of claim 3, wherein the hardware processor is additionally configured to provide the new portion of code to other systems.

7. The system of claim 3, wherein the hardware processor is additionally configured to determine whether the new portion of code is valid.

8. The system of claim 1, wherein the hardware processor is configured to provide an indication of a ready to lock state.

9. The system of claim 1, wherein to indicate to lock the plurality of repositories the hardware processor is further configured to indicate to lock a repository stored on the system.

10. The system of claim 1, wherein to indicate to lock the plurality of repositories the hardware processor is further configured to indicate to lock a repository stored on another system.

11. The system of claim 1, wherein the hardware processor is further configured to:
in the event a swap indication to not swap is received but swapping references is approved, provide a repair indication to the system that provided the swap indication to not swap.

12. The system of claim 1, wherein the hardware processor is further configured to:
in the event swapping references is not approved, provide an indication that changing a portion of code has failed.

13. The system of claim 1, wherein the hardware processor is further configured to:
in the event swapping references is approved, provide an indication that changing a portion of code has completed.

14. The system of claim 1, wherein the system and one or more other systems each determine whether swapping references is approved by a vote.

15. The system of claim 1, wherein the processor is further configured to:
  in the event swapping references is approved, provide an indication to one or more other systems to swap references.

16. A method, comprising:
  receiving a request to change a portion of code;
  determining, using a hardware processor, a change reference associated with the code and an existing reference associated with the code;
  indicating to lock a plurality of repositories of a distributed repository with access to the code;
  requesting the plurality of repositories to approve the request to change the portion of code;
  receiving a corresponding vote from each repository of the plurality of repositories;
  determining whether swapping references is approved by a majority of the plurality of repositories based on the corresponding votes; and
  in response to determining that swapping references is approved by the majority of the plurality of repositories:
    modifying the code by swapping the existing reference associated with the code with the change reference associated with the code; and
    indicating to unlock the plurality of repositories.

17. A computer program product, the computer program product being embodied in a non-transitory computer readable storage medium and comprising computer instructions for:
  receiving a request to change a portion of code;
  determining, using a processor, a change reference associated with the code and an existing reference associated with the code;
  indicating to lock a plurality of repositories of a distributed repository with access to the code;
  requesting the plurality of repositories to approve the request to change the portion of code;
  receiving a corresponding vote from each repository of the plurality of repositories;
  determining whether swapping references is approved by a majority of the plurality of repositories based on the corresponding votes; and
  in response to determining that swapping references is approved by the majority of the plurality of repositories:
    modifying the code by swapping the existing reference associated with the code with the change reference associated with the code; and
    indicating to unlock the plurality of repositories.

* * * * *